United States Patent [19]

Nakano et al.

[11] Patent Number: 4,912,634

[45] Date of Patent: Mar. 27, 1990

[54] DATA PROCESSING SYSTEM USING MULTIPLEXER FOR VARIABLE SEQUENCING BASED ON INSTRUCTION TYPE OF INSTRUCTIONS PREFETCHED FOR PARALLEL PROCESSING

[75] Inventors: Tadayoshi Nakano; Toyohiko Yoshida, both of Itamishi, Japan

[73] Assignee: Mitsubishi Denki K. K., Tokyo, Japan

[21] Appl. No.: 72,709

[22] Filed: Jul. 13, 1987

[30] Foreign Application Priority Data

Oct. 15, 1986 [JP] Japan .................. 61-245803

[51] Int. Cl.⁴ .................. G06F 9/38; G06F 15/16; G06F 9/28
[52] U.S. Cl. .................. 364/200; 364/238; 364/244.3; 364/263.1
[58] Field of Search ... 364/200 MS File, 900 MS File

[56] References Cited

U.S. PATENT DOCUMENTS

| | | | |
|---|---|---|---|
| 4,110,822 | 8/1978 | Porter et al. | 364/200 |
| 4,360,868 | 11/1982 | Retter | 364/200 |
| 4,551,799 | 11/1985 | Ryan et al. | 364/200 |
| 4,561,052 | 12/1985 | Tateno | 364/200 |
| 4,691,277 | 9/1987 | Kronstadt et al. | 364/200 |
| 4,709,324 | 11/1987 | Kloker | 364/200 |
| 4,714,994 | 12/1987 | Oklobdzija et al. | 364/200 |
| 4,722,047 | 1/1988 | Chan et al. | 364/200 |
| 4,747,045 | 5/1988 | Hargai et al. | 364/200 |
| 4,763,245 | 8/1988 | Emma et al. | 364/200 |
| 4,791,557 | 12/1988 | Angel et al. | 364/200 |
| 4,847,748 | 7/1989 | Yamahata et al. | 364/200 |

OTHER PUBLICATIONS

The Bipolar Digital Integrated circuits data Book for Design Engineers, Part 2, TTL & Bipolar Memory, 1982, Nippon Texas Instruments.

*Primary Examiner*—Archie E. Williams Jr.
*Assistant Examiner*—Glenn Richman
*Attorney, Agent, or Firm*—Kanesaka & Takeuchi

[57] ABSTRACT

A data processing system having a main memory, includes instruction prefetch queue for fetching instructions from the main memory; processing unit for interpreting the instructions from the prefetch queue; and selection unit for selecting a predetermined set of control signals from a plurality of control signals input and output for the processing unit to fetch the instructions from the instruction prefetch queue.

2 Claims, 2 Drawing Sheets

FIG. 1
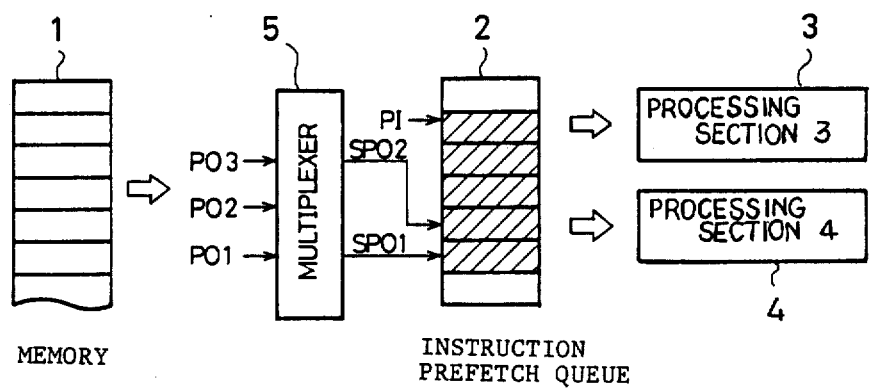
FIG. 2 (a)
| MODE | (A) | (B) | (C) |
|------|-----|-----|-----|
| SPO1 | PO1 | PO2 | PO3 |
| SPO2 | PO2 | PO3 | PO1 |
FIG. 2 (b)
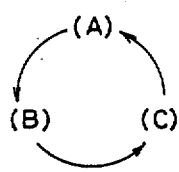
FIG. 2 (c)
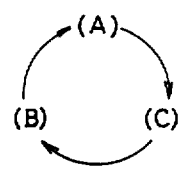

| PHASE | PH1 | PH2 | PH3 | PH4 | PH5 |
|---|---|---|---|---|---|
| PO1 | o | +3 | o | — | o |
| PO2 | | o | — | +3 | — | o |
| PO3 | — | — | o | +3 | — |
| SPO1 | o | | o | | o |
| SPO2 | | o | | o | | o |
| PROCESSING SECTION 3 | ↓OUTPUT | PROCESS | ↓OUTPUT | PROCESS | ↓OUTPUT |
| PROCESSING SECTION 4 | OUTPUT↓ | PROCESS | OUTPUT↓ | PROCESS CANCEL | OUTPUT↓ |

| PHASE | PH1 | PH2 | PH3 | PH4 | PH5 | PH6 | PH7 |
|---|---|---|---|---|---|---|---|
| PO | o | +1 | o | +1 | o | +1 | o |
| PROCESSING SECTION 3 | ↓OUTPUT | PROCESS | | | ↓OUTPUT | PROCESS | ↓OUTPUT |
| PROCESSING SECTION 4 | | | ↓OUTPUT | PROCESS | | | |

DATA PROCESSING SYSTEM USING MULTIPLEXER FOR VARIABLE SEQUENCING BASED ON INSTRUCTION TYPE OF INSTRUCTIONS PREFETCHED FOR PARALLEL PROCESSING

BACKGROUND OF THE INVENTION

1. Field of the Invention

The present invention relates to data processing system equipped with an instruction prefetch device.

2. Description of the Prior Art

FIG. 4 shows the instruction prefetch section of a conventional data processing system or computer having a plurality of types of instructions and an instruction prefetch queue. It consists of a main memory 1, an instruction prefetch queue 2, a processing section 3 for processing the instruction base portion, a processing section 4 for processing the instruction extension portion, a pointer PI for instruction prefetch queue input, and a pointer PO for instruction prefetch queue output.

The operation will be described with reference to FIG. 5. Suppose that instruction types include a type 1 consisting of an operation code (one word length) and a literal (one word length) and a type 2 consisting of only an operation code (one word length). The word herein used has an appropriate length for expressing an operation code and a literal code. The literal code means displacement value, immediate value, absolute value (address), etc. The operation code and literal code are processed in the processing sections 3 and 4, respectively. The process is carried out in phases. The phase herein used means the time required to fetch one word from the instruction prefetch queue 2 or advance the pointer. In order to make the description clearer, respective phases will be given numbers, such as PH 1, PH 2, .... The same reference numerals or characters denote identical parts or equivalents in the drawings throughout the description.

In the PH 1, a word of an instruction is fetched into the processing section 3. In the PH 2, the fetched instruction is analyzed and the pointer PO's value is incremented by one. In the PH 2, the type of the fetched instruction is also determined. If it is a type 1, one word is fetched to the processing section 4 in the PH 3. While the processor 4 processes it, the pointer PO's value is simultaneously incremented by one in the PH 4. In the PH 5, a word of another instruction is fetched to the processing section 3. In the PH 6, the fetched instruction is analyzed while the pointer PO's value is incremented by one. If the instruction is determined to be a type 2, a word of another instruction is fetched to the processing section 3 instead of the processing section 4 in the PH 7. In this way, the types 1 and 2 of instructions are processed.

As has been described above, in the conventional computer equipped with an instruction prefetch queue, either the processing section 3 or processing section 4 can operate at a time, thus requiring four phases to process a type-1 instruction and two phases to process a type-2 instruction and has poor processing efficiency.

SUMMARY OF THE INVENTION

It is a primary object of the invention to provide a data processing system having high process speed.

According to the invention there is provided a data processing system having a main memory, which comprises instruction prefetch queue for fetching instructions from said main memory; processing unit for interpreting said instructions from said instruction prefetch queue; and selection unit for selecting M continuously cyclic control signals from N control signals, where M is smaller than N, and outputting them for said processing means to fetch said instructions from said instruction prefetch queue.

Other objects, features, and advantages of the invention will be apparent from the following description when taken in conjunction with the accompanying drawings.

BRIEF DESCRIPTION OF THE DRAWINGS

FIG. 1 is a block diagram of the instruction fetch section of a data processing system embodying the present invention.

FIGS. 2(a), (b), and (c) show sets of pointer combinations and their cyclic changes.

DESCRIPTION OF THE PREFERRED EMBODIMENTS

Figures 3, 4, 5:
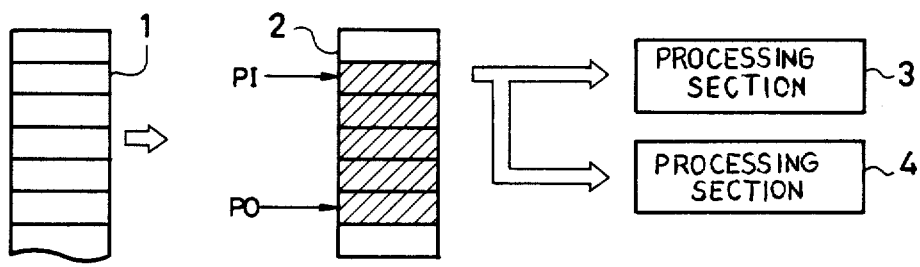
FIG. 3 is a chart for illustrating the operation of an instruction prefetch queue according to the invention.
FIG. 4 is a block diagram of the instruction fetch section of a conventional computer.
FIG. 5 is a chart for illustrating the operation of an instruction prefetch queue according to the prior art.

Referring now to FIG. 1 there is shown the instruction fetch section of a data processing system or computer according to the present invention. The same reference numerals as those of FIG. 4 denote identical parts. A three-input, two-output multiplexer 5 serves as a selection circuit for selecting two output pointers from three output pointers PO1, PO2, and PO3. The first, second and third pointers PO1, PO2, and PO3 are used for the instruction prefetch queue outputs, respectively, which are to be input to the multiplexer 5. SPO1 and SPO2 are the fourth and fifth pointers useful for instruction prefetch queue outputs selected as output control signals. In this embodiment, a plurality of types of instructions may be processed so that the prefetch section is adapted to store a plurality of types of instructions. For this reason, there are provided a pair of processing sections; a first processing section for processing the basic portion of an instruction and a second processing section for processing the extended portion of an instruction. A plurality of second processing sections may be provided. The selection circuit 5 is capable of selecting successive M control lines out of N control lines (M<N). The Nth control line is wrapped around to the first control line, and M is a given number of successive signal lines.

The operation will be described assuming that the instruction types are the same as those of the conventional and the phases are given numbers for clearer description. First of all, the operation of the multiplexer 5 in FIG. 1 will be described. The multiplexer 5 receives pointers PO1, PO2, and PO3 and outputs a set of pointers PO1 and PO2, PO2 and PO3, or PO3 and PO1. Let the set of SPO1=PO1 and SPO2=PO2 be a mode A, the set of SPO1=PO2 and SPO2=PO3 a mode B, and the set of SPO1=PO3 and SPO2=PO1 a mode C (see FIG. 2(a)). When the instruction type is determined, the mode is switched in the direction of (C)→(B)→(A)→(C) for the type 1 (FIG. 2(c)) and (A)→(B)→(C)→(A) for the type 2 (FIG. 2(b)).

The operation of the instruction fetch section will be described with reference to FIG. 3. Suppose that the multiplexer 5 is in the mode A. In the PH 1, the processing sections 3 and 4 each fetch a word of the instruction in the prefetch queue 2 specified by the pointers SPO1 (=PO1) and SPO2 (=PO2), respectively. In the PH 2, the pointer PO1, which has been connected to the pointer SPO1 in the PH 1, is increased by three while the processing section 3 analyzes the instruction and the processing section 4 processes the instruction. At this point, the instruction type is determined. Suppose now that it is a type 1. Then, the mode of the multiplexer 5 is switched from (A) to (C) and the pointers SPO1 and SPO2 are connected to the pointers PO3 and PO1, respectively.

In the PH 3, the pointer PO2, which is connected to neither pointer SPO1 nor SPO2, is increased by three while the processing sections 3 and 4 fetch a word of the instruction specified by the pointers SPO1 (=PO3) and SPO2 (=PO1), respectively. In the PH 4, the pointer PO3 connected to the pointer SPO1 is increased by three while the processing section 3 analyzes the instruction and the processing section 4 processes the instruction. At this point, the instruction type is determined. Suppose now that it is a type 2 this time. Then, the mode of the multiplexer 5 is switched from (C) to (A) and the pointers SPO1 and SPO2 are connected to the pointers PO1, and PO2, respectively, while the contents of the processing section 4 are cancelled. In the PH 5, the processing sections 3 and 4 each fetch a word of the instruction specified by the pointers SPO1 (=PO1) and SPO2 (=PO2), respectively. In this way, the processing sections 3 and 4 operate in parallel, thus reducing the processing time. In this embodiment there are three modes A, B, and C, but the number of modes increases as M and N increase.

As has been described above, according to the invention there is provided a data processing system which comprises instruction prefetch queue for fetching instructions from said main memory; processing unit for interpreting said instructions from said instruction prefetch queue; and selection unit for selecting a predetermined set of control signals from a plurality of control signals input and output for said processing unit to fetch said instruction from said instruction prefetch queue, so that the prefetch output may be controlled efficiently, thus increasing the process efficiency.

While a preferred embodiment of the invention has been described above, such description is for illustrative purpose only, and it is to be understood that changes and variations may be made without departing from the spirit and scope of the invention as defined in the following claims.

What is claimed is:

1. A data processing system having a main memory, which comprises:

an instruction prefetch queue for fetching instructions from said main memory;

instruction processing means for interpreting said instructions from said instruction prefetch queue;

selection means connected to said instruction prefetch queue for selecting successive M control lines from N control lines, with the N-th control line being wrapped around to a first control line, and outputting said selected M control lines for said instruction processing means to fetch said instructions from said instruction prefetch queue;

said selection means consisting of a three-input, two-output multiplexer selecting two out of three output pointers PO1, PO2, and FO3;

said selection means switching among three modes A, B, and C in a direction of C to B to A to C when said instruction is of a first type which consists of a word of operation code and a word of literal and in a direction of A to B to C to A when said instruction is of a second type which consists of only a word of operation code, wherein A represents a set of a first selected instruction prefetch queue output pointer SPO1=PO1 and a second selected instruction prefetch queue output pointer SPO2=PO2, B a set of SPO1=PO2 and SP2=PO3, and C a set of SPO1=PO3 and SPO2=PO1.

2. A data processing system comprising:

a main memory;

an instruction prefetch queue for prefetching instructions from said main memory;

a first processing section for processing base portions of said instructions;

a second processing section for processing operation codes and literal of said instructions;

an input pointer for input of said instruction prefetch queue;

2 output pointers for output of said instruction prefetch queue;

selection means connected to said instruction prefetch queue for selecting said 2 output pointers from 3 output pointers according to instruction types, whereby said first and second processing sections operate in parallel, thus providing the increased processing speed; and said selection means switching among three modes A, B, and C in a direction of C to B to A to C if said instruction is a first type of instruction which consists of a word of operation code and a word of literal while in a direction of A to B to C to A if said instruction is a second type of instruction which consists of only a word of operation code, wherein A represents a set of first and second output pointers selected, B a set of second and third output pointers selected, and C a set of third and first output pointers selected.

* * * * *